United States Patent [19]
Schunack

[11] 3,720,779
[45] March 13, 1973

[54] METHOD AND APPARATUS FOR TRANSLATING COLOR INFORMATION OF A PATTERN INTO RECORDINGS

[75] Inventor: Johannes Schunack, Berlin-Lichterfelde, Germany

[73] Assignee: Franz Morat GmbH, Stuttgart-Vaihingen, Germany

[22] Filed: March 9, 1971

[21] Appl. No.: 122,487

Related U.S. Application Data

[63] Continuation of Ser. No. 878,996, Dec. 5, 1969, abandoned, which is a continuation of Ser. No. 601,204, Dec. 12, 1966, abandoned.

[30] Foreign Application Priority Data

Dec. 15, 1965 Germany ............................M 67647
Oct. 19, 1966 Germany ............................M 71331

[52] U.S. Cl. ..............................................178/5.2 R

[51] Int. Cl. ..............................................H04n 9/02

[58] Field of Search ...........178/5.2 R, 5.2 A, 5.4 R, 178/5.4 CD, 6.6 A; 250/226

[56] References Cited

UNITED STATES PATENTS

| | | | |
|---|---|---|---|
| 3,181,987 | 5/1965 | Polevitzky | 178/5.2 R |
| 3,176,141 | 3/1965 | Siegemund | 250/226 |
| 1,839,361 | 1/1932 | Weaver et al. | 178/5.2 R |
| 2,965,703 | 12/1960 | Loughlin | 178/5.2 A |

*Primary Examiner*—Richard Murray
*Attorney*—Michael S. Striker

[57] ABSTRACT

The differently colored areas of a sample pattern are automatically translated into control impulses which represent color and position of the areas of the sample pattern and are used for controlling recording elements to record on tracks of a record carrier.

14 Claims, 12 Drawing Figures

Inventor
Johannes Schwoch
by Michael J. Striker

Inventor
by

Inventor
by
Atty

Inventor

METHOD AND APPARATUS FOR TRANSLATING COLOR INFORMATION OF A PATTERN INTO RECORDINGS

CROSS-REFERENCE TO RELATED APPLICATIONS

An application Ser. No. 601,179, assigned to the same assignee for a "Method and Apparatus for Recording a Program Representing a Sample Pattern" was filed on Dec. 12, 1966, now U.S. Pat. No. 3,555,852, by Hans Joachim Stock et al. The present application is a continuation application of my copending application Ser. No. 878,996 filed Dec. 5, 1969, now abandoned, which is a continuation application of my application Ser. No. 601,204 filed Dec. 12, 1966, now abandoned.

BACKGROUND OF THE INVENTION

The present invention relates to the sensing of colors for the purpose of producing control impulses which may be used for making recordings on a program carrier by which a textile machine can be controlled to make a fabric having a multicolored design.

It is known to use a program tape for controlling the operations of textile machines, for example, of a circular knitting machine. Since every recording determines the yarn used for a particular stitch of a design, it is of greatest importance that the program tape accurately represents the desired design and pattern of the fabric. In accordance with the prior art, a program tape is made by a manual operation on the basis of a sample pattern which has differently colored areas arranged in crossing lines and columns. Each area represents a stitch of the fabric, and when corresponding stitches are made by yarns having the same colors as the corresponding areas of the sample pattern, the color pattern of the fabric will be the same as represented by the sample pattern. However, the recordings on the program tape must be made in a particular order to obtain the proper sequence of operations of the textile machine to produce the desired pattern. Evidently, the order of the records on the program tape is different from the arrangement of the areas on the sample pattern. The design of the pattern cannot be visually recognized on the program tape.

When the color information of the sample pattern is manually transferred to the program tape by punching holes, or by forming transparent or opaque areas, errors easily occur which will cause an incorrect pattern of the textile fabric. Even small errors are immediately visually apparent on the fabric, rendering the same objectionable. The requirement for accuracy is so high that of several million stitches of the textile fabric, only one wrong stitch is acceptable. The probability of error must be smaller than $10^{-6}$ to $10^{-7}$.

In the above-mentioned copending application, a method and apparatus are described by which a program tape is automatically produced in such a manner that its recordings represent the color information of a sample pattern. This requires the sensing of the colors of the design of the sample pattern.

SUMMARY OF THE INVENTION

It is one object of the invention to accurately translate the color information of a sample pattern into distinguishable control impulses which represent the color and position of each sensed area of the sample pattern.

Another object of the invention is to accurately translate the color information of a sample pattern into control impulses which can produce such recordings on a program tape that a textile machine controlled by the program tape will make a fabric whose color design is the same as the color design of the sample pattern.

With these objects in view, the present invention relates to a method for translating the color information of a design or sample pattern having a predetermined number of different colors into control signals, and for recording the control signals on a record carrier for controlling the operations of a textile machine.

The sample pattern or design consists of areas disposed in crossing lines and columns. Each area is colored in only one color of the predetermined number of colors.

Each of the colors of the design produces, when illuminated, color rays of high intensity within a different high-intensity range of wave lengths, and color rays of low intensity within the high-intensity ranges of wave lengths of the respective other colors.

When the colored areas are illuminated, each colored area produces colored rays of high-intensity only within the high-intensity range associated with the respective color, and colored rays of low intensity within the high-intensity ranges associated with the respective other colors.

The areas are successively sensed by a set of sensing means whose number is the same as the predetermined number of colors of the sample pattern. Each sensing means is responsive only within the high-intensity range of only one of the different colors, respectively, so that only the one sensing means which senses color rays of high intensity responds and produces a control signal representing the color of the respective sensed area.

A number of recording elements, which number is equal to the number of sensing means of the set of sensing means is placed on spaced tracks of a record carrier. The recording elements are controlled by the control signals so that the recordings produced under the control of different sensing means are recorded on different tracks.

Areas of the sample pattern are successively sensed by the set of sensing means until the color information of all areas are recorded on the record carrier.

An embodiment of an apparatus for translating color information into control impulses, and for recording the color information, comprises a sample pattern having colored areas representing the colors of stitches to be made by a textile machine, each area having a single color of a set of different colors and reflecting upon illumination colored rays of high intensity within a different high-intensity range of wave lengths, respectively; support means for the sample pattern; illuminating means for simultaneously illuminating a predetermined number of the colored areas; the same predetermined number of sets of sensing means, the sensing means of each set being respectively associated with the colors of the set of colors and responding only to colored rays of high intensity in the range of wave lengths of the respective color to produce a control impulse representing the respective color when sensing an area;

operating means for moving said illuminating means and said number of sets of sensing means, and said support means relative to each other to scan said sample pattern so that the colors of all areas of the sample pattern are translated into control impulses representing the position and color of the areas of the sample pattern; means movably supporting a record carrier; and a number of recording elements equal in number to the number of the sensing means and electrically connected with said sensing means, respectively, for receiving said control impulses from the same so that each recording element is associated with one of said colors.

The recording elements are spaced from each other so that the recordings produced under the control of different sensing means and by the respective recording means are recorded on different tracks.

In a preferred embodiment of the invention, the sample pattern may have a set of three or four colors, and a corresponding set of three or four sensing means responsive to the high-intensity ranges of different colors is provided for each sensed area. The above-mentioned predetermined number is selected in view of the construction of the textile machine which is eventually to be controlled by a tape made under the control of the control impulses.

In the preferred embodiment of the invention, each sensing means includes a photocell, lens means, a reflecting mirror and a color filter for the high-intensity range of the color with which the respective sensing means is associated. The illuminating means include an electronic flash device, a diaphragm, and lens means for shaping the beam of light to fall only on the areas which are to be illuminated and sensed.

The present invention is based on the recognition of the fact that colors of a sample pattern, which can be easily visually distinguished, cannot always be recognized by photoelectric sensing means. Consequently, the sample pattern is photoelectrically sensed at at least two wave lengths of light, corresponding to at least two colors of the sample pattern and each color is selected to produce only at a particular range of wave length a strong photosignal or rays of high intensity and at other wave lengths a negligible small photosignal or rays of low intensity. The white base of the sample pattern produces a strong photosignal at all wave lengths of the light since it reflects all wave lengths uniformly.

The term "photosignal" is used in the present application to describe rays having the color of the illuminated area by which they are reflected, or the color of a transparent area by which illuminating rays were partly absorbed.

The square areas of the sample pattern are colored in accordance with the design, except areas which are to represent white, the color of the base of the sample pattern.

The sensing determines whether a color is provided at the respective sensed areas of the sample pattern, and which color the sensed area has.

In one arrangement of the invention, the sample pattern is illuminated, and the light reflected by each illuminated area is photoelectrically sensed. However, it is also possible to sense the light passing through a transparent sample pattern. In the first case the reflecting properties of the colors have to be considered, in the second case, the transparency of the colors. It is also possible to draw and manually paint a sample pattern original, and then photograph the same to produce a color transparency or a color print which can be sensed.

The maximum photosignal and colored rays of highest intensity reflected by a colored area, or having passed through a colored area, are produced at a particular preferably narrow range of the wave lengths of the spectrum characteristic for the respective color used. The sensing means according to the invention include color filters which have a narrow wave length range in respective regions of the spectrum, respectively, and permit passage of the photosignals only within this narrow range. In other words, the light permeability of the filters for the wavelength of light of a particular color is very great within a small range, and very small outside of this small range. In this manner, an error-free recognition of the different colors, which produce strong photosignals in respective narrow ranges, is achieved.

The apparatus of the invention has as many phototransistors and filters as there are colors used in the design, and preferably an additional sensing means including a phototransistor, is provided for responding to unifiltered white light. However, it is not absolutely necessary that such additional sensing for unfiltered light is carried out.

Since in accordance with the present invention a row of areas of the sample pattern is preferably simultaneously sensed, a diaphragm with a correspondingly shaped slot is used for confining the light to the sensed areas. In a modified arrangement, a diaphragm having as many perforations as there are sensed areas is provided so that light falls through each perforation on one of the simultaneously sensed areas. In accordance with the cross section of the perforation, beams of light of square or circular cross section are formed for illuminating the areas.

As compared with the illumination of all areas through a slot of the diaphragm, the individual and point shaped illumination through perforations of a diaphragm has the advantage that the light can be accurately confined to each sensed area. In the event that the sensed areas are squares, the diameter of circular diaphragm perforations is in the same ratio to the side of a square area as the ratio of magnification of a spherical lens through which the beam of light is guided to the sensed and illuminated area. In this manner, the cross section of the beams of light impinging the illuminated areas of the sample pattern can be adapted to the dimensions of the sensed area.

The sensing of the sample pattern requires a relative movement between the illuminating and sensing means on one hand, and the pattern on the other hand. In the preferred embodiment of the invention, the illuminating and sensing means are mounted on a carriage, and the colored sample pattern is supported by a supporting table. Assuming that the column direction of the pattern is Y, and the line direction of the pattern is X, the carriage is movable, for example, in the direction Y, and the illuminating and sensing means are movable in a direction X on the carriage, and both motions are produced by stepping motors which respectively connected with the carriage and the illuminating and sensing means by a transmission having such a ratio that at least one step of the stepping motors corresponds to the distance between two areas of the sample pattern.

The transmission ratio between stepping motor and the illuminating and sensing means is advantageously selected so that during the sensing operation and movement from one area to the next for a distance which may be 2 mm, for example, a stepping motor makes 30 steps. It is also possible to operate the stepping motor for 30 steps, and then stop the same for a time period corresponding to two steps, and to perform the sensing operation during this time period when the illuminating and sensing means are at a standstill.

Due to the use of stepping motors in accordance with the present invention, the illuminating and sensing means can be stepwise shifted very exact distances, and exactly the desired number of steps, as is required for sensing the sample pattern, without any inaccuracies in the relative position of the illuminating and sensing means and the columns and lines of the sample pattern.

The stepping motors are connected by flexible cables with a voltage source. The amplifiers of the photocells of the sensing means are also connected by flexible cables to apparatus which, under the control of the control impulses produced by the photocells, effects the making of recordings on a program tape.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
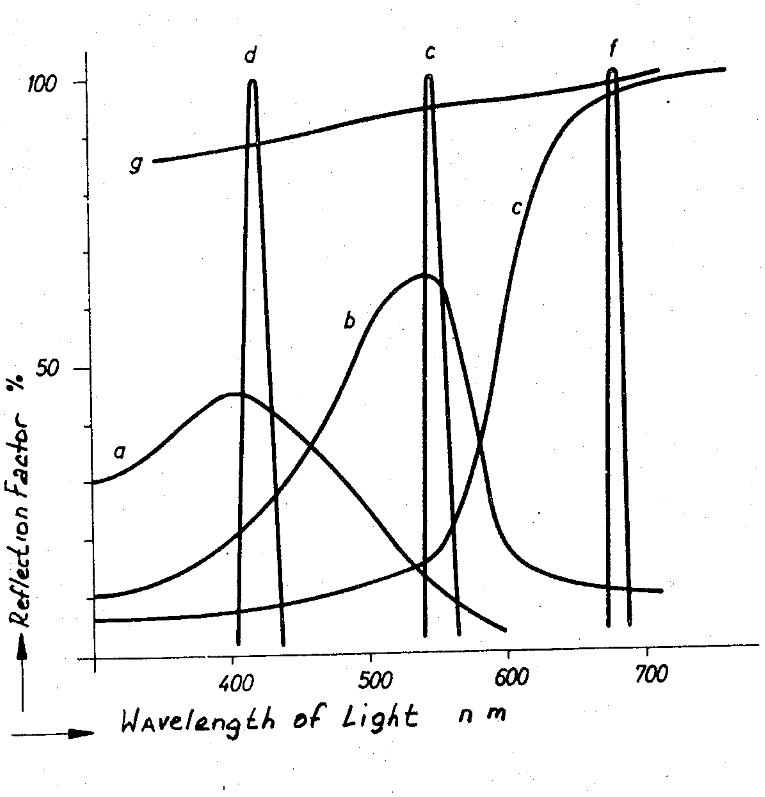
FIG. 1 is a diagram illustrating the reflection factors of different colors depending on the wavelength of the light.
Figures 10, 10A, 11:
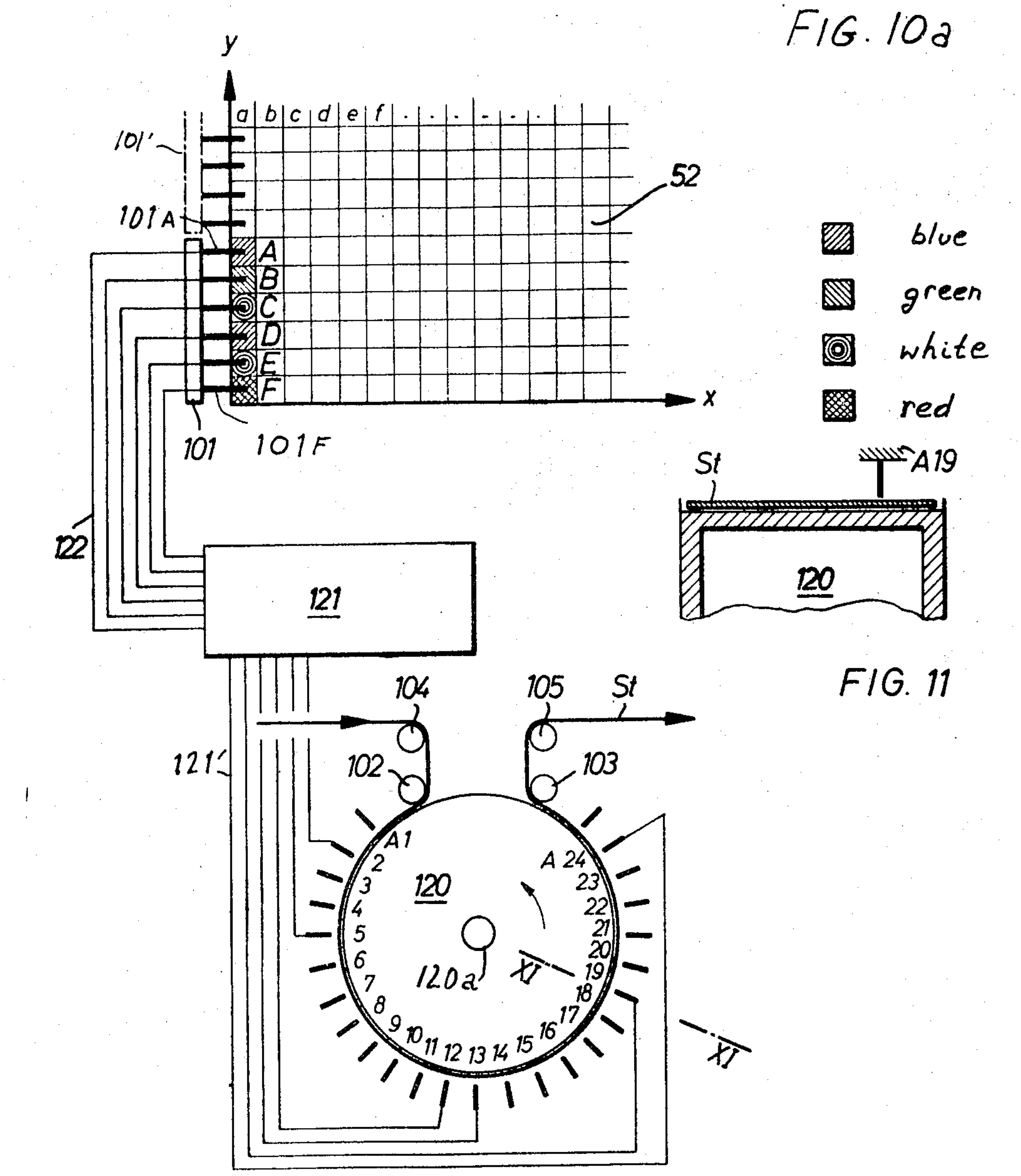
FIG. 10 is a fragmentary schematic view illustrating the control of recording apparatus by the apparatus of the invention.
FIG. 10*a* is a schematic illustration of the symbols used in FIG. 10 for indicating color.
FIG. 11 is a fragmentary sectional view taken on line XI—XI in FIG. 10.

A sample pattern 52 is shown in the upper portion of FIG. 10, and consists of square areas forming columns in the direction of the Y axis and lines in the direction of the X axis. The areas are differently colored in accordance with the original design, only six areas being shown in FIG. 10 with the respective colors indicated in a manner explained by FIG. 10a. The colors blue, green and red may be applied to the respective areas of the sample pattern, whose base is assumed to be white. The reflection factors depending on the wave length of the light are indicated for the colors blue, green and red of the paints or dyes used, by the three graphs *a*, *b*, *c*, as shown in FIG. 1. At 420 mm, the reflection factor of the color blue of the paint or dye used, is a maximum, while the reflection factors of the red and green colors of the paint or dye used, are very small. At the wave length 550 mm, the reflection factor is a maximum for the color green, but small for the other colors. At 680 mm, the reflection factor for the color red is a maximum, and the reflection factors for the other colors practically disappear.

It is important that the actually used colors have high intensity in one range, and low intensity in other ranges, and that the high-intensity range of each color is located in the spectral region of the low-intensity ranges of the respective other colors.

For example, FIG. 1 shows the graph *b* having a high-inetensity range indicated by the peak, and low-intensity ranges which are located at the wave lengths where the other graphs *a* and *c* have their peaks. By using different colors having such properties, it is possible to use sensing means for each color which will not respond to the respective other colors since the same have low intensities in the respective sensed region. For example, the filter range is indicated by the graph *e* and is located at the high-intensity range of the graph *b* for green light, and located at very low points of the graph *a* and *c* for blue and red so that the respective photoelectric sensing means which is associated with filter *e*, will not even respond to the low intensity rays of the graphs *a* and *c* representing the colors blue and red.

Where no colors are provided on the sample pattern, the basic white color of the paper base reflects the white light, and the graph *g* indicates the substantial constant reflection factor of white light.

In accordance with the invention, the sensing is carried out by photocells receiving photo signals reflected by the painted areas of the sample pattern, and for each color, a color filter is provided whose permeability is a maximum in the regions of the wave length of the light where the reflection factors of the several colors are a maximum, while other colors are hardly reflected.

Graphs *d*, *e* and *f* represent the light permeability for a blue filter, a green filter and a red filter, respectively, which is highest within a narrow filter range. Monochromatic interference filters may be used. Each filter will permit the passage of light of one color within a given range of wave lengths of the light. Where no color is entered on the sample pattern, the light reflected by the white base paper is divided into different colors which pass through all three filters.

Figure 2:
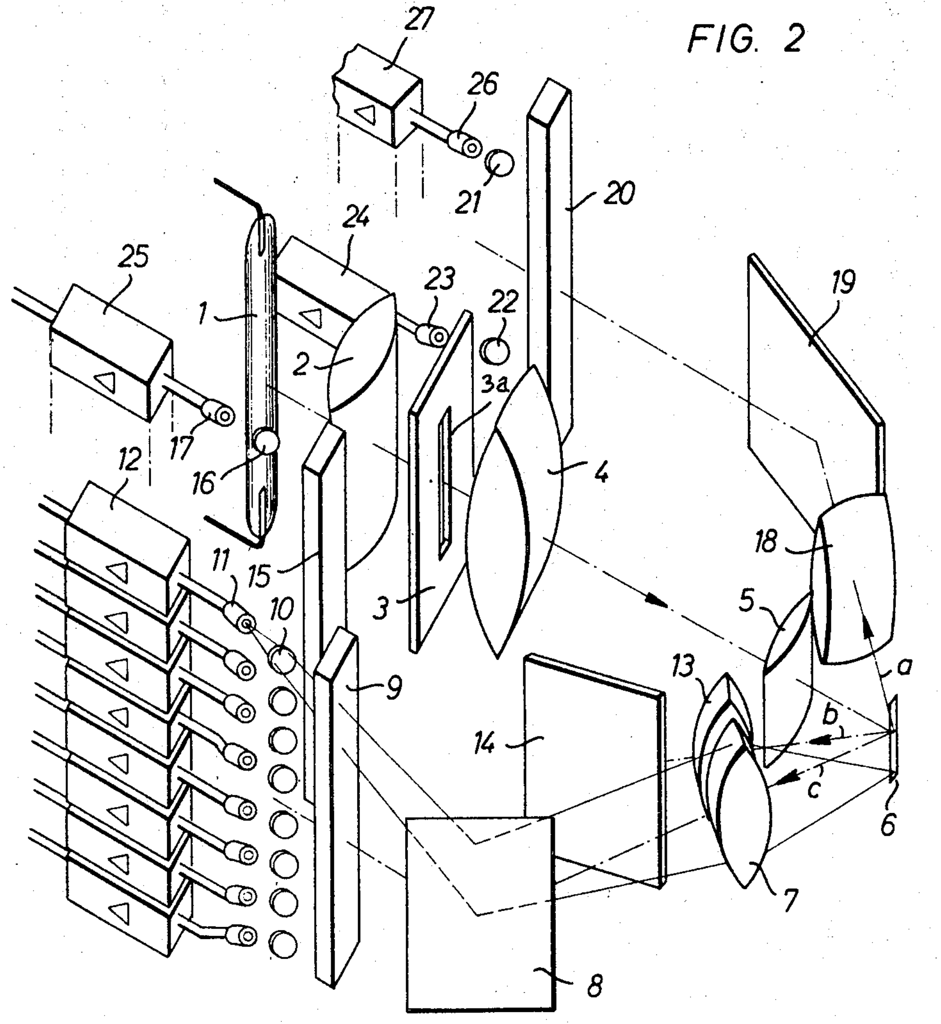
FIG. 2 is a fragmentary schematic perspective view illustrating illuminating and sensing means according to one embodiment of the invention.

The embodiment illustrated in FIG. 2 has an electronic flash device 1 as a source of light. The light passes through a cylinder lens 2, a slot 3*a* and a diaphragm 3, a spherical lens 4, another cylinder lens 5, and forms a strip of light 6 which has the outline of the six areas A, B, C, D, E, F, shown in FIG. 10 so that only these areas, and no other area of the sample pattern 52 are illuminated. Of course, the slot may have a different configuration for illuminating a smaller number of areas, and even a single area may be illuminated and sensed.

The illuminated colored areas of the sample pattern reflect light at different angles toward three sensing means. A strong photo signal *a* reflected by a blue area passes through a lens 18 to a reflecting mirror 19 where it is reflected to pass through a color filter 20 and a collecting lens 21 into a phototransistor 26 which produces an impulse amplified by an amplifier 27.

A strong photo signal *b* reflected by a green area passes through lens 13, is reflected by reflecting mirror 14 toward the green filter 15 and passes through a collecting lens 16 into a phototransistor 17 which produces an impulse amplified by amplifier 25.

A strong photo signal *c* reflected by a red area passes through lens 7 and is reflected by a reflecting mirror 8 through a red filter through a collecting lens 10 into the phototransistor 11 which produces an impulse amplified by amplifier 12. As best seen in FIG. 1, the high-intensity ranges of the reflected colored light rays at the peaks of graphs *a*, *b*, *c*, coincide with the respective filter ranges of graphs *d*, *e*, *f*. Furthermore, the high-intensity range of each color is located in a region where the other colors produce low-intensity rays, and each color has a high-intensity range of wave lengths different from the high intensity ranges of the other colors.

FIG. 2 shows eight amplifiers 12 and eight corresponding phototransistors 11 arranged in a stack. Corresponding stacks of amplifiers 25 with phototransistors 17, and of amplifiers 27 with the phototransistors 26 are provided, but only schematically indicated in FIG. 2. Signals *a* and *b* are assumed to be reflected by low areas D and B as shown in FIG. 10 so that reflected signals a and b do not enter the illustrated uppermost lenses 21 and 16, respectively, but enter lower lenses 21 and 16 which are associated with lower phototransistors 26 and 17, respectively, not shown, of the respective stacks of amplifiers and phototransistors.

Figures 3, 4:
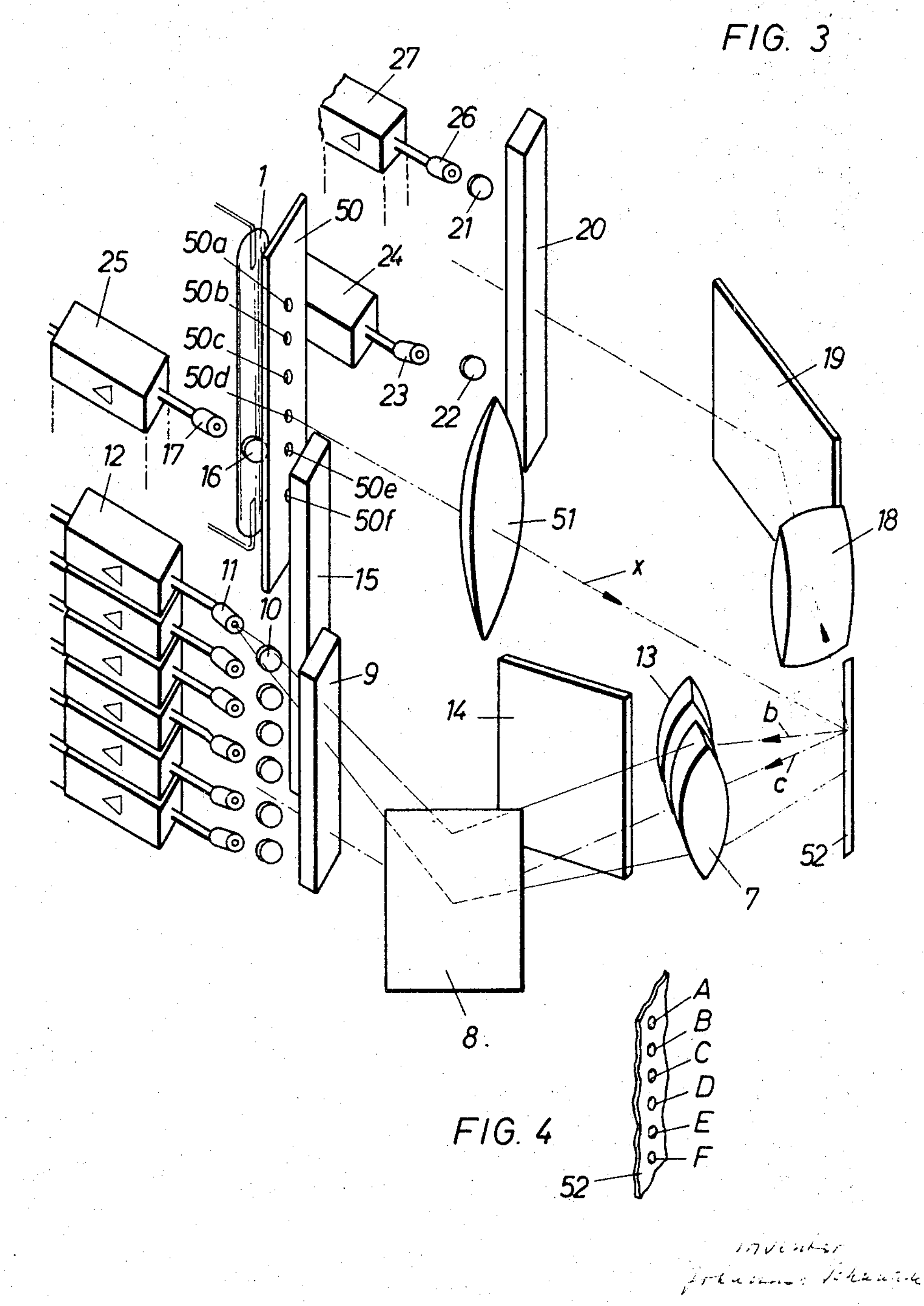
FIG. 3 is a fragmentary schematic perspective view illustrating a modified embodiment of the illuminating and sensing means of the invention.
FIG. 4 is a fragmentary perspective view on an enlarged scale illustrating a detail of the embodiment of FIG. 3.

A series of eight phototransistors and amplifiers is provided for each sensed color in the embodiment of FIG. 2 under the assumption that eight areas of the sample pattern are simultaneously sensed. In the embodiment of FIG. 3, a series of six amplifiers and phototransistors is provided for each color, corresponding to the sensing of six areas, as shown in FIG. 10. In other word, in the embodiment of FIG. 2, a series of eight sets of sensing means is provided, wherein each set of sensing means includes three sensing means respectively associated with three different colors. The number of the sets of sensing means, eight in the embodiment of FIG. 2 and six in the embodiment of FIG. 3 and FIG. 10 is the same number as the number of areas simultaneously sensed in the sample pattern.

As will be explained hereinafter, the eight control impulses simultaneously produced by the embodiment of FIG. 2, and the six control impulses simultaneously produced by the embodiment of FIG. 3, are used for controlling recording elements which make recordings on a program tape used for controlling a textile machine, such as a circular knitting machine. Assuming that the knitting machine has 24 knitting systems, or stations where colored yarns are fed, and that three colors are used, the number of sets of sensing means is 24 3, which is eight. If four colors are used, as in the embodiment of FIG. 3, the number of sets of sensing means is 24 4, which is six. A program tape will have 24 tracks for the three colors and eight knitting stations of the embodiment of FIG. 2. Any number of additional tracks can be provided on the program tape for the white color of the base of the sample pattern, in which event the same number of collecting lenses 22, phototransistors 23, and amplifiers 24 are provided for receiving and sensing unfiltered white light as shown in FIG. 3. Collecting lens 22 is placed to receive the light reflected by a white area and to guide the light into phototransistor 23.

The modified embodiment of FIG. 3 is similar to the embodiment of FIG. 2, but has a series of six sets of four sensing means for red, green, white and blue light. It is assumed that in this arrangement the color white is used as a design color. Irrespective of the number of the sets of sensing means, the embodiment of FIG. 3 differs from the embodiment of FIG. 2 by the provision of a diaphragm 50 which has six perforations 50*a*, 50*b*, etc. whose number is the same as the number of simultaneously sensed areas of the sample pattern. The series of six sets of sensing means 101A to 101F is schematically shown in FIG. 10 to be carried by a common operating member 101.

The light produced by the source of light 1 is divided by the apertures of diaphragm 50, see also FIG. 4, into six beams which pass through a spherical lens 51 onto the six areas A to F of the sample pattern 52, forming circular light dots on the same. The light is reflected and sensed by one of the four phototransistors 11, 17, 23, 26 associated with each sensed area. Only a single light beam is shown in FIG. 3 to pass through an aperture 50*d*. The other five light beams are not shown in FIG. 3 for the sake of simplicity.

Figure 5:
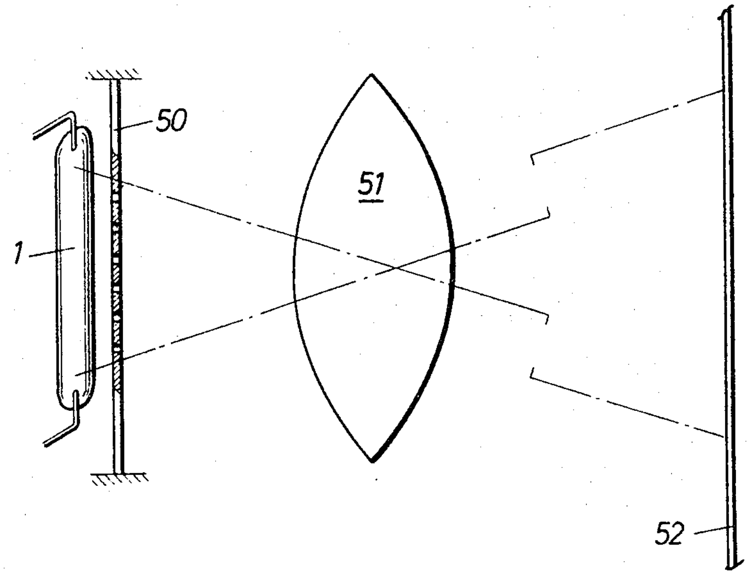
FIG. 5 is a fragmentary side view illustrating on an enlarged scale a detail of the embodiment of FIG. 3.

FIG. 5 shows that the light rays emitted by the source of light 1 will cross in lens 51 and are magnified by the same. A magnification of 1 : 2 is assumed. If the spherical lens system 51 has a focal length of 75 mm, the object distance is $3/2 \cdot 75$ which is 112.5 mm, and the image distance is $3 \cdot 75$, which is 225 mm. The arrangement permits to provide sufficient space between the sample pattern and the spherical lens system 51 so that the reflecting mirrors 8, 14, 19 and the lenses 7, 13, 18 can be arranged adjacent the sensed sample pattern. Phototransistors 11, 17, 23, 26 and the associated amplifiers are placed closely adjacent each other, and the filters 9, 15 and 20 have corresponding positions, so that the entire illuminating and sensing means can be enveloped by a small housing which can be moved by suitable operating means over a stationary support on which the sample pattern 52 is placed. If the areas of the sample pattern are square, the apertures 50*a* to 50*f* may have a corresponding outline so that each area is fully illuminated, and the adjacent areas are not illuminated.

In the embodiment of FIG. 2 it is assumed that only the colors blue, green and red are used in the design. If none of these colors is sensed, and white light is reflected, special tracks for white have to be provided on the program tape which is produced under the control of the controlimpulses produced by the phototransistors.

In the embodiment of FIG. 3, it is assumed that the four colors blue, green, red and white are used in the design of the sample pattern.

The embodiment of FIG. 3 is used in the apparatus illustrated in FIGS. 10 and 11 which is described in detail in the above-mentioned simultaneously filed related application Ser. No. 601,179. The apparatus of FIG. 10 is used for recording on a program tape *St* which has 24 longitudinal recording tracks respectively associated with 24 knitting systems or stations of a knitting machine having 24 yarn carriers. Consecutive four yarn carriers of consecutive four knitting systems respectively supply four differently colored yarns which are knitted to form loops in a predetermined pattern sequence at each of six groups of four knitting systems which can be operated by the program tape. Correspondingly, six areas of the sample pattern 52 have to be simultaneously sensed, and six groups of tracks cooperating with recording elements have to be provided on the program tape for recording control impulses from the sensing means, wherein each group of tracks has four tracks associated with the four colors of the design. Whenever the device 1 produces a flash, six areas of the sample pattern are simultaneously illuminated, and the six sets of four sensing means including the four phototransistors 11, 17, 23, 26, respectively, sense the respective color of the illuminated areas to produce six control impulses.

The illuminating and sensing device shown in FIG. 10 is stepwise shifted in the direction X by operating means 101, which will be explained in greater detail hereinafter. In this manner, six areas in six lines A to F will be successively sensed in successive columns *a*, *b*, and so forth. At the end of the sample pattern 52 in the direction X, the operating means 101 returns the device to the initial position, and shifts the same in the direction Y to another sensing position 101' in which the sensing means are again stepwise moved in the direction X. The number of columns sensed by the sensing means depends on the periodic repetition of the design of the pattern, each of the columns *a* to *f* corresponding to a needle wale of the knitted fabric. If the pattern is repeated after six wales, for example, the sensing means is moved back to the position 101' after six steps *a* to *y* in the direction X.

The stepwise movements of the operating means 101 are transmitted by a suitable conventional transmission to the shaft 120*a* of a drum 120 on whose periphery a section of a program tape blank *St* is located. Twenty-four recording elements A1 to A24 are provided circumferentially and axially spaced about the periphery of drum 120 to make recordings on the tape. The number of recording elements corresponds to the number of colored yarns used at each knitting station, and to the number of knitting stations of the knitting machine which is to be controlled by the recordings made on the program tape St. The recording elements are spaced in circumferential direction distances respectively corresponding to the number of needles between the knitting stations of the circular knitting machine. Program tape *St* is guided by rollers 105, 102, 103, 104. Each track of the program tape is associated with one of the recording elements A1 to A24, groups of four recording elements being associated with corresponding groups of tracks. Each recording element of each group is associated with one of the four colors, and the tracks of the respective groups are also associated with the same colors. Since the tracks are transversely spaced in axial direction of drum 120, the recording elements are also transversely spaced across the tracks in axial direction of drum 120.

The recording elements may be punches, or known recording elements which, when excited, expose a small area of a photographic program tape blank by a flash of light.

In the partial sectional view of FIG. 11, a recording element A19 is shown disposed on the program tape blank St.

As explained above, each of the six illuminating sets of sensing means 101A and 101F includes a set of four sensing means, each of which includes a phototransistor, and a color filter. Six lines 122 are shown in FIG. 10, and each line includes four conductors respectively connected with the amplifiers 12, 25, 24, 27. The 24 conductors 122 are connected with the input of an electronic control device 121 which has 24 output lines respectively connected with the recording elements A1 to A24, only six lines 121' being shown in FIG. 10. The six illustrated lines are respectively connected with recording elements A2, A5, A12, A13, A19, and A24 to cause the recording of the information sensed in the six sensed areas A to F. Since this arrangement is not an object of the invention, it will not be further described, but it will be understood that the recording elements are energized under the control of the control impulses produced by the illuminating and sensing device shown in FIG. 3.

Operating means for moving the illuminating and sensing device relative to the sample pattern are shown in FIGS. 6 to 9. The casing of the device is designated 101 corresponding to the schematic showing of FIG. 10. The casing has bearing parts 201 and 203 guided on a pair of shafts 202 and 204 which are connected by transverse members 205 and 206 to form a carriage. Rollers 207 and 209 are secured to shaft 202 and turn with the same, while rollers 208 and 210 are freely rotatable on shaft 204 which is secured by pins 222 and 223 to the transverse members 205 and 206. A rack bar 224 is also secured to the carriage and extends parallel to shafts 202 and 204.

Figure 9:
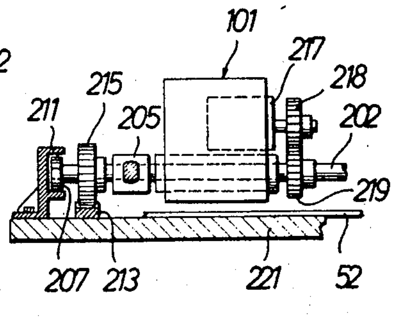
FIG. 9 is a fragmentary sectional view taken on line IX—IX in FIG. 6.

Rollers 207, 208 roll on a rail 211, see also FIG. 9, the rollers 209 and 210 roll on another rail 212. Rails 211 and 212 extend in the direction Y of the schematically indicated sample pattern 52, while shafts 202 and 204 extend in the direction X of the sample pattern. The sample pattern 52 rests on a support table 221 to which rails 211 and 212 are secured. The table also carries a pair of parallel rack bars 213 and 214 which are respectively engaged by gears 215 and 216 secured to shaft 202 which is turnable in bearing portion 201 of the casing 101. Due to the guidance of rollers 207, 209 in the U-shaped rails 211, 212, shaft 202 cannot move in axial direction.

Above the bearing portion 201, a stepping motor 217 is secured which drives a gear 218 meshing with a gear 219 secured to shaft 202 non-rotatably, but movable in axial direction.

When stepping motor 217 operates, it turns shaft 202 so that gears 215, 216 roll on rack bar 213, 214 and move the carriage, generally designated 220, stepwise in the direction of the rails 211, 212, corresponding to the direction of the Y axis of the sample pattern 52. The stepping motor 217 is reversible so that the carriage can be moved in opposite directions.

The casing of the illuminating and sensing device is slidable on shaft 202 and 204 of carriage 220 in the direction of the X axis of the sample pattern. Another stepping motor 225 is secured on top of the bearing portion 203 of the casing of the illuminating and sensing device, and has a gear 226 meshing with the reack bar 224 which is secured to carriage 220. When stepping motor 225 operates, it moves the casing of the device along shafts 202 and 204 since gear 226 rolls on rack bar 224. In this manner, the stepwise shifting of the illuminating and sensing device from the column *a* to the columns *b*, *c* and so forth of the sample pattern, 52, as shown in FIG. 10, is obtained. The shifting of the illuminating and sensing means to the position 101' in FIG. 10 is obtained by moving carriage 220.

Figure 6:
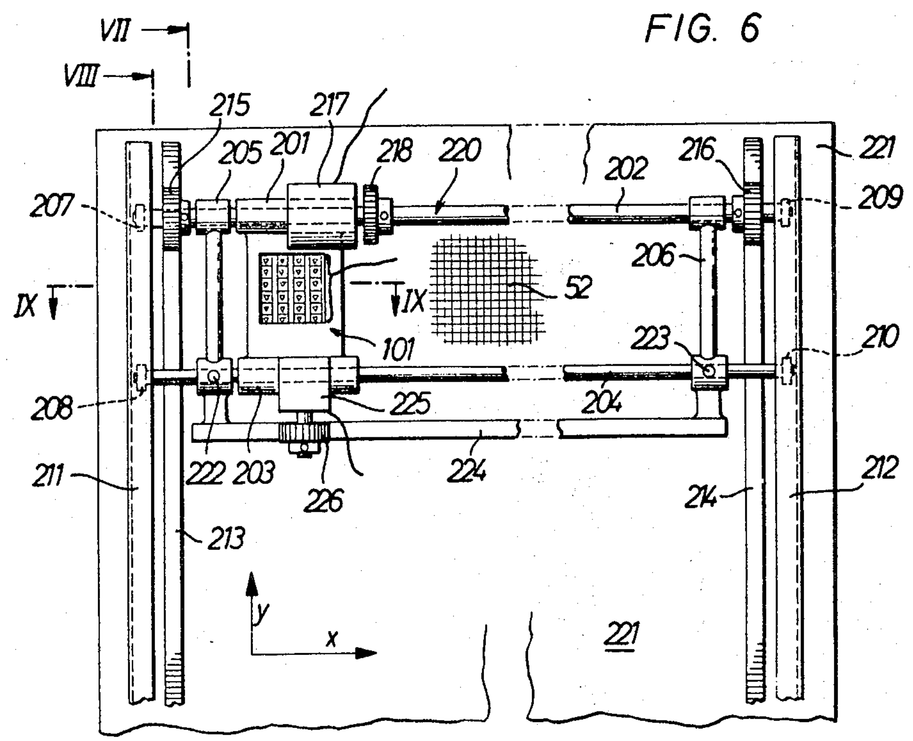
FIG. 6 is a fragmentary plan view illustrating an apparatus of the invention for moving the illuminating and sensing means over a sample pattern.
Figure 7:
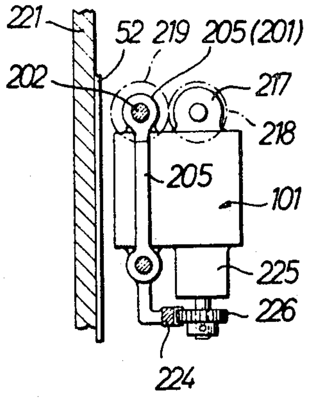
FIG. 7 is a fragmentary sectional view taken on line VII—VII in FIG. 6.
Figure 8:
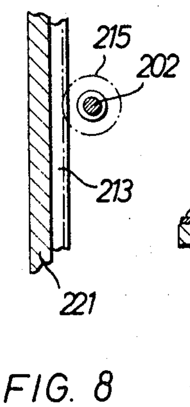
FIG. 8 is a fragmentary sectional view taken on line VIII—VIII in FIG. 6.

The two stepping motors 217 and 225 have such a transmission ratio that each step in the direction X or Y corresponds to the distance between two adjacent areas of the sample pattern. While only a small portion of the sample pattern 52 is shown in FIG. 6, the sample pattern may have such a size as to cover the width and length of table 221.

The stepping motors may make very small steps, and for example perform 30 steps to shift the illuminating and sensing device from one area to the next area, and then stop for a time period corresponding to two steps to permit the sensing of the pattern area. Since a great many small steps of the stepping motors correspond to the step from one area to the next area, the illuminating and sensing device can be placed exactly over the area to be sensed.

Flexible cables connect the stepping motors 217 and 225 with the voltage source, and the cables 122 shown in FIG. 10, which connect the illuminating and sensing device with the electronic control device 121, are also flexible. As mentioned above, only six cables 122 are shown, each of which has four conductors respectively connected with the four amplifiers 12, 25, 24, 27 of the respective sensing means 101A and 101F.

It will be understood that each of the elements described above, or two or more together, may also find a useful application in other types of arrangements for translating color information into control impulses and recordings.

While the invention has been illustrated and described as embodied in a method and apparatus for sensing colored areas of a sample pattern by sets of sensing means respectively associated with different colors and controlling recording elements, it is not intended to be limited to the details shown, since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

I claim:

1. A method of translating into control signals, the color information of a design having a predetermined plurality of different colors, and for recording the control signals on a record carrier for controlling the operations of a textile machine, comprising: preparing a sample pattern consisting of a plurality of colored areas disposed in crossing lines and columns so as to represent the colored design, each area being colored only in one color of said predetermined plurality of colors, each of said colors producing, when illuminated, color rays of high intensity within a different high-intensity range wave lengths of the respective other colors; successively illuminating groups of said colored areas having a predetermined number, so that each illuminated colored area produces colored rays of high intensity only within the one high color range of wave length associated with the respective color; successively sensing said groups of successively illuminated areas by said predetermined number of sets of sensing means, respectively, the number of sensing means in each set being the same as said number of said plurality of different colors of said sample pattern, so that the total number of said sensing means is equal to said predetermined number of said colored areas of each group of illuminated and sensed areas multiplied by the number of said plurality of different colors, and each sensing means of each set being responsive only within the high-intensity range of wave lengths of only one of said different colors, respectively, so that only the one sensing means of said set which senses color rays of high intensity responds and produces a control signal representing the color of the respectively sensed area; placing a number of recording elements on spaced tracks of the record carrier, the number of recording elements being equal to said total number of said sensing means of said sets; and controlling by said control signals said recording elements, respectively, so that the recordings produced under the control of different sensing means of different sets of sensing means by the respective recording elements are recorded on different tracks.

2. The method of claim 1 wherein each illuminated colored area reflects colored rays of high intensity within the respective high-intensity range of wave lengths, and reflects rays of low intensity in the high-intensity ranges of wave lengths of the respective other colors.

3. The method of claim 1 wherein said colored areas are transparent; and wherein each illuminated area permits the passage of colored rays of high intensity within the respective high-intensity range of wave lengths and permits passage only of rays of low intensity in the high-intensity ranges of wave lengths of the respective other colors.

4. The method of claim 1, wherein said sample pattern has a basic color which produces rays of substantially constant intensity for all wave lengths of light; wherein some of said areas of said sample pattern have said basic color; wherein all sensing means of said sets of sensing means respond when sensing an area having said basic color; wherein each set of sensing means produces a special control impulse when all said sensing means of said set respond; and comprising recording on a further track of said record carrier by a further recording element under the control of said special control impulses.

5. The method of claim 1 wherein the sensed groups of areas are illuminated by a flash of light.

6. Apparatus for translating color information into control impulses, and for recording the color information, comprising, in combination, a sample pattern having a plurality of colored areas representing the colors of stitches to be made by a textile machine, each area having a single color of a plurality of different colors and producing upon illumination colored rays of high intensity; support means for said sample pattern; illuminating means for simultaneously illuminating a predetermined number of said areas; the same predetermined number of sets of sensing means so that the total number of said sensing means is equal to said predetermined number of illuminated areas multiplied by the number of said plurality of said different colors, the sensing means of each set being respectively associated with the colors of said plurality of different colors and responding only to said colored rays of high intensity in the respective color to produce a control impulse representating the respective color when sensing an area; operating means for moving said illuminating means and said predetermined number of said sets of sensing means, and said support means relative to each other, to scan all areas of said sample pattern so that the colors of all areas of said sample pattern are translated into control impulses representing the position and color of said areas of said sample pattern; means movably supporting a record carrier; and a plurality of recording elements equal in number to said total number of said sensing means and being electrically connected with said sensing means, respectively, for receiving said control impulses from the same so that each recording element is associated with the color sensed by one of said sensing means of said total number of sensing means, said recordings elements being spaced from each other so that the recording produced under the control of different sensing means by the respective recording means are recorded on different tracks.

7. An apparatus as claimed in claim 6, wherein each sensing means includes a photocell, and optical means for guiding the respective colored rays of high intensity into the photocell, said optical means including a color filter having a narrow filter range of wave lengths corresponding to said high-intensity range of wave lengths of the colored rays of high intensity produced by the respective sensed colored area.

8. An apparatus as claimed in claim 6 wherein said illuminating means includes a source of light, diaphragm means and lens means for shaping the light of said source to fall only on said predetermined number of said areas.

9. An apparatus as claimed in claim 8 wherein said diaphragm means is formed with a narrow slot; and wherein said predetermined number of said areas is arranged in a line so as to be illuminated by light passing from said source through said slot.

10. An apparatus as claimed in claim 8 wherein said diaphragm means includes a plurality of spaced openings, the cross section of each opening corresponding to the size of one of said areas, and wherein said openings are arranged in a pattern corresponding to the pattern of said predetermined number of said areas.

11. An apparatus as claimed in claim 10 wherein said lens means of said illuminating means include a system of spherical lenses disposed between said diaphragm means and said sample pattern; and wherein said openings of said diaphragm means have a smaller size than the light spots projected by said spherical lens system onto said areas of said pattern, the ratio of said sizes being in reverse proportion to the magnification by the spherical lens system.

12. An apparatus as claimed in claim 6 wherein said areas are disposed in crossing columns and lines on said sample pattern; and wherein said operating means include a carriage movable in the direction of said lines across said support means and said sample pattern, a casing movable on said carriage in the direction of said columns; a first stepping motor for stepwise moving said carriage; and a second stepping motor stepwise moving said casing; said illuminating and sensing means being located in said casing and moving with the same, at least one step of said stepping motors corresponding to the distance between two adjacent areas of said sample pattern.

13. An apparatus as claimed in claim 12 comprising rack bars mounted on said support means an on said carriage, respectively and extending at right angles to each other, and pinions driven by said stepping motors and meshing with said rack bars.

14. Apparatus as claimed in claim 6 wherein said sample pattern has a basic color which produces rays of substantially constant intensity for all wave lengths of light; wherein some of said areas of said sample pattern have said basic color: wherein all sensing means of any set of sensing means respond when sensing an area having said basic color; wherein each set of sensing means produces a special color impulse when all sensing means of thereof respond; and wherein said plurality of recording elements includes in addition to said number of recording elements, a plurality of additional recording elements connected with each set of sensing means, respectively, for receiving said special color impulses so that each additional recording element is associated with said basic color, said additional recording elements being disposed for recording on additional tracks.

* * * * *